United States Patent
Bae

(10) Patent No.: US 12,261,538 B2
(45) Date of Patent: Mar. 25, 2025

(54) ZERO VOLTAGE SWITCHING CIRCUIT AND CONVERTER COMPRISING SAME

(71) Applicant: LG INNOTEK CO., LTD., Seoul (KR)

(72) Inventor: Su Ho Bae, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 215 days.

(21) Appl. No.: 17/918,719

(22) PCT Filed: Apr. 8, 2021

(86) PCT No.: PCT/KR2021/004440
§ 371 (c)(1),
(2) Date: Oct. 13, 2022

(87) PCT Pub. No.: WO2021/210850
PCT Pub. Date: Oct. 21, 2021

(65) Prior Publication Data
US 2023/0291300 A1    Sep. 14, 2023

(30) Foreign Application Priority Data

Apr. 14, 2020 (KR) .................. 10-2020-0045437

(51) Int. Cl.
*H02M 3/335* (2006.01)
*H02M 1/00* (2006.01)
*H02M 1/08* (2006.01)

(52) U.S. Cl.
CPC ..... *H02M 3/33576* (2013.01); *H02M 1/0058* (2021.05); *H02M 1/083* (2013.01);
(Continued)

(58) Field of Classification Search
CPC ............... H02M 1/083; H02M 1/0058; H02M 3/33573; H02M 3/33576; H02M 1/0009;
(Continued)

(56) References Cited

U.S. PATENT DOCUMENTS 9,729,070 B2 * 8/2017 Liu ................... H02M 3/33546
9,954,453 B1 * 4/2018 Ishino ..................... H02M 1/08
(Continued)

FOREIGN PATENT DOCUMENTS

CN 104901550 A 9/2015
JP 2012-60157 A 3/2012
(Continued)

*Primary Examiner* — Yusef A Ahmed
(74) *Attorney, Agent, or Firm* — Birch, Stewart, Kolasch & Birch, LLP

(57) ABSTRACT

A zero voltage switching circuit includes a zero voltage switching unit which forms a full-bridge circuit at the primary side of a converter and comprises a plurality of switches for zero voltage switching; an adjustable inductor which performs zero voltage switching in resonance with a parasitic capacitor of the zero voltage switching unit, and is adjusted according to control of a control unit; and the control unit which controls inductance of the adjustable inductor according to an input voltage of the zero voltage switching unit or an electric current flowing in the adjustable inductor.

11 Claims, 3 Drawing Sheets

(52) U.S. Cl.
CPC ...... *H02M 3/33573* (2021.05); *H02M 1/0009* (2021.05); *H02M 1/0054* (2021.05)

(58) Field of Classification Search
CPC ..... H02M 3/015; H02M 1/0054; H01F 21/12; H01F 38/16; Y02B 70/10
See application file for complete search history.

(56) References Cited

U.S. PATENT DOCUMENTS

| | | | | |
|---|---|---|---|---|
| 10,749,441 | B1* | 8/2020 | Singh | H02M 3/33584 |
| 11,394,307 | B2* | 7/2022 | Chen | H02M 7/04 |
| 11,990,842 | B2* | 5/2024 | Sheng | H02M 1/14 |
| 2002/0054498 | A1* | 5/2002 | Cho | H02M 3/3376 |
| | | | | 363/132 |
| 2003/0052658 | A1* | 3/2003 | Baretich | H02M 5/293 |
| | | | | 323/284 |
| 2015/0055374 | A1* | 2/2015 | Yamashita | H02M 3/01 |
| | | | | 363/17 |
| 2015/0124487 | A1* | 5/2015 | Fu | H02M 3/015 |
| | | | | 363/17 |
| 2015/0131329 | A1* | 5/2015 | Chen | H02M 3/3385 |
| | | | | 363/17 |
| 2016/0013657 | A1* | 1/2016 | Jeong | H02J 50/402 |
| | | | | 307/104 |
| 2016/0079866 | A1* | 3/2016 | Mizushima | H02M 3/3376 |
| | | | | 363/17 |
| 2016/0172982 | A1* | 6/2016 | Yamaoka | H01F 21/00 |
| | | | | 363/21.03 |
| 2016/0254702 | A1* | 9/2016 | Akuzawa | H02M 7/48 |
| | | | | 307/104 |
| 2017/0187285 | A1* | 6/2017 | Kim | H02M 3/158 |
| 2018/0294681 | A1* | 10/2018 | Bae | H02J 50/70 |
| 2018/0301997 | A1 | 10/2018 | Lee | |
| 2018/0350513 | A1* | 12/2018 | Murakami | H01F 37/00 |
| 2020/0366215 | A1* | 11/2020 | Chen | H02M 3/33576 |
| 2020/0412248 | A1* | 12/2020 | Onozaki | H02M 3/158 |
| 2021/0036618 | A1* | 2/2021 | Lambert | G01R 19/16538 |
| 2022/0085728 | A1* | 3/2022 | Mantooth | H02M 1/0058 |
| 2023/0307918 | A1* | 9/2023 | Ginart | H02M 3/33573 |
| 2024/0204669 | A1* | 6/2024 | Oelmann | H02M 3/33515 |

FOREIGN PATENT DOCUMENTS

| | | |
|---|---|---|
| KR | 10-2018-0029713 A | 3/2018 |
| WO | WO 2019/144241 A1 | 8/2019 |

* cited by examiner

| S1 | S2 | S3 | ZVS Inductor |
|---|---|---|---|
| Low | High | High | 1uH |
| High | Low | High | 2uH |
| Low | Low | High | 3uH |
| High | High | Low | 4uH |
| Low | High | Low | 5uH |
| High | Low | Low | 6uH |
| Low | Low | Low | 7uH | ical problem in that the efficiency decreases due to an increase in power loss.

ZERO VOLTAGE SWITCHING CIRCUIT AND CONVERTER COMPRISING SAME

CROSS REFERENCE TO RELATED APPLICATIONS

This application is the National Phase of PCT/KR2021/004440 filed on Apr. 8, 2021, which claims priority under 35 U.S.C. § 119 (a) to Patent Application No. 10-2020-0045437 filed in the Republic of Korea on Apr. 14, 2020, all of which are hereby expressly incorporated by reference into the present application.

TECHNICAL FIELD

The present invention relates to a zero voltage switching circuit, and more particularly, relates to a zero voltage switching circuit for varying the inductance of an inductor according to a current flowing through the zero voltage inductor, and a converter comprising the same.

BACKGROUND ART

A DC-DC converter applied to a vehicle or the like includes a full-bridge circuit comprising a plurality of switches. At this time, in order to reduce the switching loss, zero voltage switching is performed by using an inductor for zero voltage switching (ZVS). The inductance value of the inductor for zero voltage switching is set so that it becomes zero voltage switching at a current level of about 10% of the maximum power. At this time, since the value of the inductance of the inductor is fixed, zero voltage switching is performed without loss at the level of 10% of the maximum power, however, when the output is increased, there is a problem in that the efficiency decreases due to an increase in power loss.

DETAILED DESCRIPTION OF THE INVENTION

Technical Subject

The technical problem to be solved by the present invention is to provide a zero voltage switching circuit that varies the inductance of an inductor according to a current flowing through the zero voltage inductor, and a converter comprising the same.

The subjects of the present invention are not limited to the subjects mentioned above, and other subjects not mentioned will be clearly understood by those skilled in the art from the following description.

Technical Solution

In order to solve the above technical problem, a zero voltage switching circuit according to an embodiment of a first embodiment of the present invention comprises: a zero voltage switching unit which forms a full-bridge circuit at the primary side of a converter and comprises a plurality of switches for zero voltage switching; an adjustable inductor which performs zero voltage switching in resonance with a parasitic capacitor of the zero voltage switching unit, and is adjusted according to control of a control unit; and the control unit which controls inductance of the adjustable inductor according to an input voltage of the zero voltage switching unit or an electric current flowing in the adjustable inductor.

In addition, the control unit reduces the inductance of the adjustable inductor when the current flowing through the adjustable inductor increases, and may increase the inductance of the adjustable inductor when the current flowing through the adjustable inductor decreases.

In addition, the control unit increases the inductance of the adjustable inductor when the input voltage of the zero voltage switching unit increases, and may decrease the inductance of the adjustable inductor when the input voltage of the zero voltage switching unit decreases.

In addition, the control unit may control the inductance of the adjustable inductor by measuring the input current of the zero voltage switching unit, the current flowing through the adjustable inductor, or the current flowing through the load at the secondary side of the converter.

In addition, the adjustable inductor may include a plurality of inductor elements.

In addition, the plurality of inductor elements may include two or more inductor elements having different inductances.

In addition, the control unit may control the inductance of the plurality of inductor elements differently by individually controlling the plurality of inductor elements.

In addition, each inductor element of the plurality of inductor elements may include: a first inductor having a predetermined inductance; a second inductor being coupled to the first inductor; and a switching unit being connected to the second inductor to turn on/off a closed loop including the second inductor.

In addition, the control unit may turn on a part of the switching units of the plurality of inductor elements according to the inductance of the adjustable inductor to be implemented.

In addition, the switching unit may include two MOSFETs, but the two MOSFETs may have opposite connection directions.

In order to solve the above technical problem, a converter according to an embodiment of the present invention comprises: a transformer unit; a full-bridge circuit being connected to the primary side of the transformer unit and comprising a plurality of switches for zero voltage switching; an adjustable inductor which performs zero voltage switching in resonance with a parasitic capacitor of the zero voltage switching unit, and is adjusted according to control of a control unit; and a control unit for controlling the inductance of the adjustable inductor according to at least one among the input voltage of the full-bridge circuit, the input current of the full bridge circuit, the current flowing in the adjustable inductor, and the current flowing in a load being connected to the secondary side of the transformer unit.

Advantageous Effects

According to embodiments of the present invention, it is possible to achieve zero voltage switching without loss even when the output is changed.

The effect according to the present invention is not limited by the contents exemplified above, and more various effects are included in the present specification.

BEST MODE

Hereinafter, preferred embodiments of the present invention will be described in detail with reference to the accompanying drawings.

However, the technical idea of the present invention is not limited to some embodiments to be described, but may be implemented in various forms, and within the scope of the technical idea of the present invention, one or more of the constituent elements may be selectively combined or substituted between embodiments.

In addition, the terms (including technical and scientific terms) used in the embodiments of the present invention, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention.

In the present specification, the singular form may include the plural form unless specifically stated in the phrase, and when described as "at least one (or more than one) of A and B and C", it may include one or more of all combinations that can be combined with A, B, and C.

In addition, in describing the components of the embodiment of the present invention, terms such as first, second, A, B, (a), and (b) may be used. These terms are merely intended to distinguish the components from other components, and the terms do not limit the nature, order or sequence of the components.

And, when a component is described as being 'connected', 'coupled' or 'interconnected' to another component, the component is not only directly connected, coupled or interconnected to the other component, but may also include cases of being 'connected', 'coupled', or 'interconnected' due that another component between that other components.

In addition, when described as being formed or arranged in "on (above)" or "below (under)" of each component, "on (above)" or "below (under)" means that it includes not only the case where the two components are directly in contact with, but also the case where one or more other components are formed or arranged between the two components. In addition, when expressed as "on (above)" or "below (under)", the meaning of not only an upward direction but also a downward direction based on one component may be included.

Figure 1:
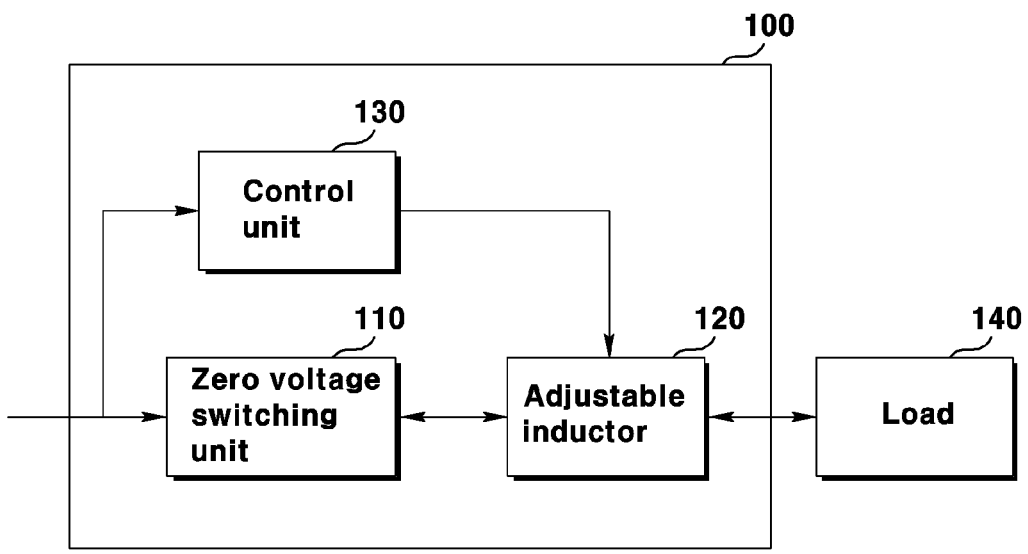
FIG. 1 illustrates a zero voltage switching circuit according to an embodiment of the present invention.

FIG. 1 illustrates a zero voltage switching circuit according to an embodiment of the present invention.

The zero voltage switching circuit 100 according to an embodiment of the present invention comprises a zero voltage switching unit 110, an adjustable inductor 120, and a control unit 130.

The zero voltage switching unit 110 comprises a full-bridge circuit at the primary side of the converter and includes a plurality of switches for zero voltage switching.

More specifically, the zero voltage switching circuit 100 according to an embodiment of the present invention is a zero voltage switching circuit applied to a converter. The converter includes a full-bridge circuit comprising a plurality of switches on the primary side, and reduces or boosts the voltage of the input power according to the complementary conduction of the upper switch and the lower switch, and delivers it to the load. Zero voltage switching is used in order to complementarily conduct the upper switch and the lower switch and to reduce the switching loss that occurs when performing a switching operation.

Figure 2:
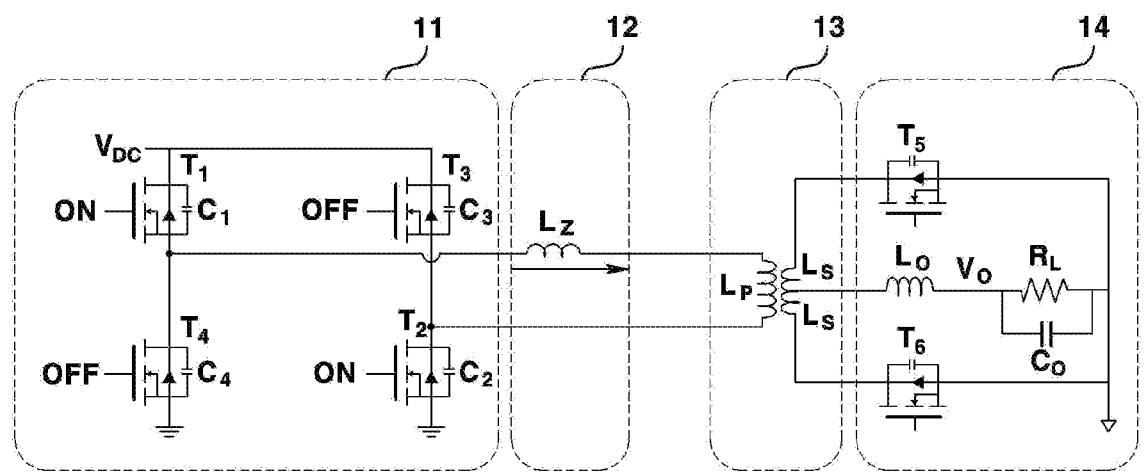
FIG. 2 illustrates a zero voltage switching circuit not including an adjustable inductor.

In order to implement zero voltage switching, a zero voltage switching inductor ($L_Z$) 12 may be used as shown in FIG. 2. The converter includes a switching unit 11 comprising a plurality of switches at the primary side of the transformer 13, and the load 14 is connected to the secondary side of the transformer 13. The zero voltage switching inductor 12 is connected between the switching unit 11 and the positive (+) terminal at the primary side of the transformer 13 to perform zero voltage switching.

Specifically, the primary side of the transformer 13 includes the full-bridge MOSFETs of $T_1$, $T_2$, $T_3$, and $T_4$ comprising the switching unit 11 and the inductor ($L_Z$) 12 for zero voltage switching (ZVS). Capacitors $C_1$, $C_2$, $C_3$, and $C_4$ are parasitic capacitors included in each MOSFET. The zero voltage switching inductor 12 resonates with the parasitic capacitor of each MOSFET to implement zero voltage switching.

The secondary side of the transformer 13 includes the synchronous rectifier MOSFETs of $T_5$ and $T_6$, and an inductor ($L_0$) and a capacitor ($C_0$) for ripple improvement, and consists of a pair in the shape of a half-bridge. Resistance ($R_L$) means load.

The $V_{DC}$ which is the input voltage of the converter is generally 350V and has a very high voltage with a maximum of 435V. When $T_1$ and $T_2$ are ON, and $T_3$ and $T_4$ are OFF, current flows upward in the primary side as shown in FIG. 2. The voltage between the drain and source terminals of $T_1$ and $T_2$ is almost zero, and the voltage between the drain and source terminals of $T_3$ and $T_4$ is almost the same as the power supply voltage.

When $T_1$ is turned off, since $L_Z$ has an inertia current, so $C_1$ is charged, and as $C_4$ discharges, then the voltage between the drain and source terminals of $T_1$ increases to decrease the voltage between the drain and source terminals of $T_4$, and finally, it becomes zero voltage. In this state, when $T_4$ is turned on, since the drain and source terminals are at zero voltage, switching can be performed without power loss.

The moment when $T_1$ is turned off, the energy stored in $L_Z$ must charge $C_1$ and discharge $C_2$, so the inductance value of $L_Z$ is determined as shown in the following equation.

$$\frac{1}{2}L_Z I^2 = \frac{1}{2}C_1 V_{DC}^2 + \frac{1}{2}C_2 V_{DC}^2 \qquad \text{[Equation 1]}$$

$$L_Z = \frac{V_{DC}^2}{I^2}(C_1 + C_2)$$

In general, the $L_Z$ value is set to zero voltage switching at a current of about 10% of the maximum power. This is because all zero voltage switching operations can be achieved at 10 to 100% of the maximum power. For example, if the current of 10% of the maximum power is 6 A, $V_{DC}$ is 350V, $C_1=C_2=1$ nF, I=6 A, and $L_Z=6.8$ µH may be enough.

Since the $L_Z$ value is fixed, accurate zero voltage switching operation without loss is achieved at the level of 10% of the maximum power, however, when the output increases, the energy stored in $L_Z$ becomes more than the energy for charging and discharging the parasitic capacitor of the MOSFET. Since this energy consequently becomes a loss, as the output increases, the power lost increases and the efficiency of the converter decreases.

Loss energy can be calculated as follows.

$$\text{Loss energy} = \frac{1}{2}L_Z I_{max}^2 - \frac{1}{2}L_Z I_{10\%}^2 \qquad \text{[Equation 2]}$$

For example, when $L_Z$=6.8 μH, $I_{max}$=14 A, $I_{10\%}$=6 A, the loss energy is 0.544 mA²H, and since the power loss is calculated by multiplying the energy loss by the switching frequency, the power loss becomes 0.544 mA²H×50 kHz=27.2 W. During the next half cycle, the same power is lost in $T_2$ and $T_4$, so the total power loss is doubled to 54.4 W.

In order to prevent such power loss, the zero voltage switching circuit 100 according to an embodiment of the present invention includes an adjustable inductor 120.

The adjustable inductor 120 resonates with the parasitic capacitor of the zero voltage switching unit 110 to perform the zero voltage switching, but is varied according to the control of the control unit 130.

More specifically, the adjustable inductor 120 performs zero voltage switching, and the inductance is adjusted according to the control of the control unit 130 to have an inductance value capable of performing zero voltage switching by resonating with the parasitic capacitors of a plurality of switches. An embodiment for implementing adjustable inductance by controlling the adjustable inductor 120 will be described in detail hereinafter.

The control unit 130 controls the inductance of the adjustable inductor 120 according to the input voltage of the zero voltage switching unit 110 or the current flowing through the adjustable inductor 120.

More specifically, the control unit 130 controls the inductance of the adjustable inductor 120 to prevent switching loss according to the input voltage of the zero voltage switching unit 110 or the current flowing through the adjustable inductor 120. The control unit 130 may be a micro control unit (MCU) as a controller.

In Equation 1, $C_1$ and $C_2$ are values that can be known in advance, and can be determined by measuring $V_{DC}$ and I. Therefore, the inductance value of the adjustable inductor can be calculated from Equation 1, and the inductance of the adjustable inductor 120 can be controlled so that the inductance value becomes the calculated inductance value or greater than or equal to the calculated inductance value.

Figure 3:
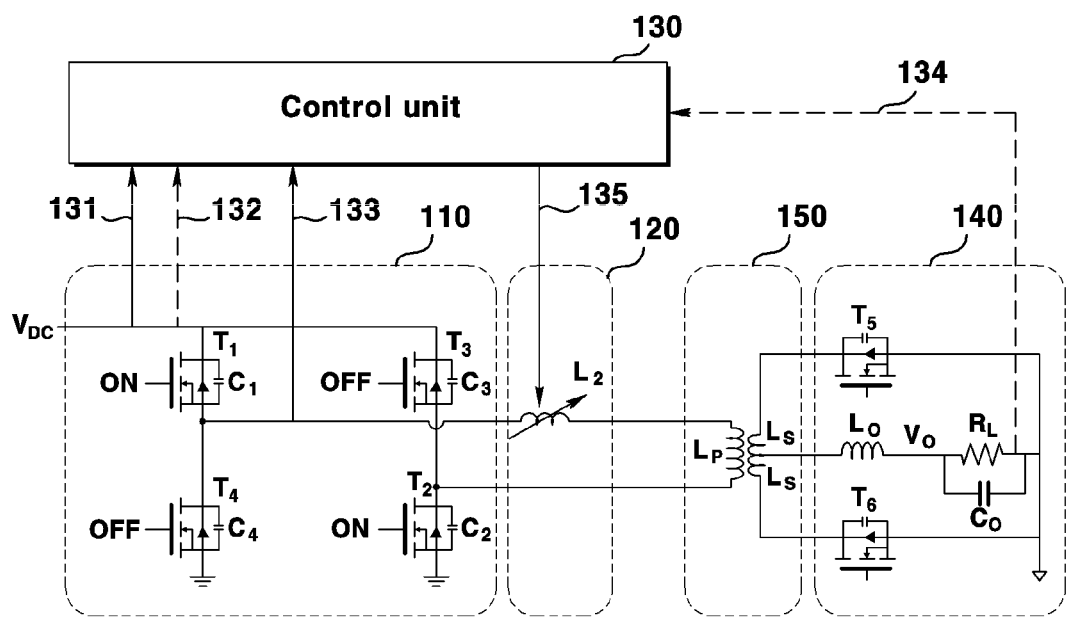
FIG. 3 illustrates a zero voltage switching circuit according to an embodiment of the present invention.

A zero voltage switching circuit including an adjustable inductor 120 and a control unit 130 may be implemented as shown in FIG. 3. The control unit 130 may measure 131 the input voltage of the zero voltage switching unit 110 or directly measure 133 the current flowing through the adjustable inductor 120. Or, if it is difficult to implement a way of direct measurement of the current flowing in the adjustable inductor 120, by using that the input current of the zero voltage switching unit is proportional to the current flowing through the adjustable inductor 120, the current flowing through the adjustable inductor 120 can be indirectly calculated by measuring the input current of the zero voltage switching unit 132. In addition, the current flowing in the adjustable inductor 120 may be indirectly calculated by measuring the current flowing in the secondary-side load $R_L$ of the converter 134. The current flowing through the adjustable inductor 120 may be indirectly calculated by measuring 134 the current flowing through the load using the point that the primary side current varies by the current drawn from the load.

The control unit can control the inductance of the adjustable inductor 120 by measuring the current flowing through the adjustable inductor 120, the input current of the zero voltage switching unit, or the current flowing through the load.

The control unit 130 reduces the inductance of the adjustable inductor 120 when the current flowing through the adjustable inductor 120 increases, and when the current flowing through the adjustable inductor 120 decreases, the inductance of the adjustable inductor 120 can be increased. When the current flowing through the adjustable inductor 120 increases, the discharge according to the resonance between the adjustable inductor 120 and the parasitic capacitor is made quickly, and even after zero voltage switching is made, inertial current flows through the adjustable inductor 120, resulting in power loss. At this time, the inductance of the adjustable inductor 120 is reduced in order to reduce the discharge rate for zero voltage switching.

Conversely, when the current flowing through the adjustable inductor 120 is decreased, the discharge is accomplished slowly and zero voltage switching may not be achieved. Therefore, when the current flowing through the adjustable inductor 120 is decreased, the inductance of the adjustable inductor 120 is increased in order to increase the zero voltage switching discharge rate.

The control unit 130 increases the inductance of the adjustable inductor 120 when the input voltage of the zero voltage switching unit 110 increases, and may decrease the inductance of the adjustable inductor 120 when the input voltage of the zero voltage switching unit 110 decreases. Since the amount of charge to be charged to and discharged from the parasitic capacitors of the plurality of switches varies according to the input voltage input to the zero voltage switching unit 110, when the input voltage being inputted to the zero voltage switching unit 110 increases, since the amount of charge to the parasitic capacitors is increased, as the amount of charge to be charged to and discharged from the parasitic capacitors is increased, the inductance of the adjustable inductor 120 is increased.

Conversely, when the input voltage inputted to the zero voltage switching unit 110 decreases, the amount of electric charge to be charged to and discharged from the parasitic capacitor is reduced, and thus the inductance of the adjustable inductor 120 is reduced.

The adjustable inductor 120 may be implemented using a plurality of inductor elements. Each of the plurality of inductor elements has a preset inductance, and by using some of the plurality of inductors, an inductance to be implemented may be realized. For example, when including three inductor elements having 1 μH inductance, 1 μH when using one of the three inductor elements, 2 μH when using two inductor elements, and 3 μH when using all of the three inductor elements.

The adjustable inductor 120 may include a plurality of inductor elements, and the plurality of inductor elements may include two or more inductor elements having different inductances. By using two or more inductor elements having different inductances instead of an inductor element having the same unit, various inductances can be implemented with a small number of inductors. The control unit 130 may control the inductance of the plurality of inductor elements differently by individually controlling the plurality of inductor elements. For example, when $L_{Z1}$ (1 μH), $L_{Z2}$ (2 μH), and $L_{Z3}$ (4 µH) inductors are included, an inductance of 1 to 7 µH can be implemented using three inductors. When only $L_{Z1}$ is used, $L_{Z2}$=2 µH, $L_{Z1}+L_{Z2}$=3 µH, $L_{Z3}$=4 µH, $L_{Z1}+L_{Z3}$=5 µH, $L_{Z2}+L_{Z3}$=6 µH, $L_{Z1}+L_{Z2}+L_{Z3}$=7 µH, such as $L_{Z1}$=1 µH, can be implemented. A maximum of $2^{n-1}$ inductances can be implemented according to the number (n) of inductors having different inductances.

Each inductor element of the plurality of inductor elements may include: a first inductor having a predetermined inductance; a second inductor being coupled to the first inductor; and a switching unit connected to the second inductor to turn on/off a closed loop including the second inductor. When the switching unit is turned on according to the form in which it is formed, the closed loop of the second inductor is opened, and when turned off, a closed loop of the second inductor may be formed. Conversely, when the switching unit is turned on, it forms a closed loop of the second inductor, and when turned off, the closed loop of the second inductor may be opened.

When it is implemented in a way that when the switching unit is on, the closed loop of the second inductor is opened, when the switching unit is turned on, the closed loop of the second inductor is opened, and the second inductor and the second inductor are not coupled, therefore the corresponding inductor element is short-circuited and has no inductance. Conversely, when the switching unit is turned off, the second inductor and the first inductor are coupled, and the corresponding inductor element operates like an inductor having the inductance of the first inductor.

Figure 4:
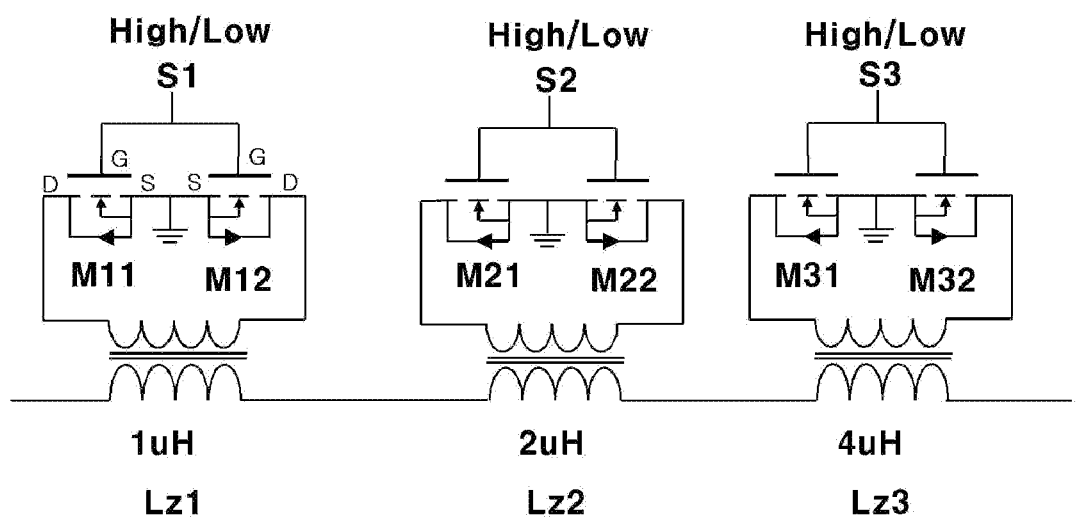
FIG. 4 illustrates an adjustable inductor according to an embodiment of the present invention.

As shown in FIG. 4, the switching unit includes two MOSFETs, and the two MOSFETs may have opposite connection directions. When a low voltage is applied to S1, which is the gate of the MOSFET, the drain-source of the MOSFETs M11 and M12 is opened, and $L_{Z1}$ operates at its original value of 1 µH. However, when a high voltage is applied to S1, the drain-source impedance of the MOSFETs M11 and M12 is shorted, so that $L_{Z1}$ does not have an inductance value and is shorted to 0 µH.

Similarly, when a low voltage is applied to S2 and S3, the original values of $L_{Z2}$ and $L_{Z3}$ of 2 µH and 4 µH can be obtained, and when a high voltage is applied, it can be controlled to have 0 µH.

When a plurality of first inductors are used and the first inductor is directly connected to the switching unit without being connected to the switching unit through a second inductor being coupled, since the voltage applied to the first inductor is in an AC form having a DC offset voltage, even if a high/low voltage is applied to S1, the MOSFET cannot be turned on or off. Therefore, it must be connected to the MOSFET using the second inductor being coupled. In this case, since there is no DC offset voltage in the voltage applied between the drain and source of the MOSFET, the MOSFET can be easily turned on and off.

The control unit 130 may adjustably control the inductance of the adjustable inductor by controlling each switching unit of the adjustable inductor implemented as shown in FIG. 4. The control unit 130 may control to turn on at least a part of the switching units of the plurality of inductor elements according to the inductance of the adjustable inductor 120 to be implemented.

Figures 5, 6:
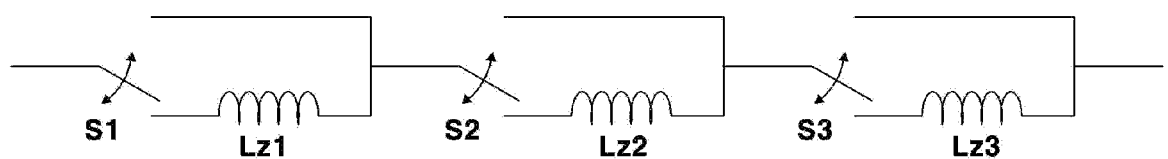
FIG. 5 is a table for explaining the control operation of an adjustable inductor according to the inductance to be implemented.
FIG. 6 illustrates an adjustable inductor according to another embodiment of the present invention.

As shown in FIG. 4, when a 1 µH, 2 µH, or 4 µH inductor element is used, as shown in FIG. 5, it is possible to vary from 1 to 7 µH in 1 µH increments by controlling each switching unit. By controlling S1 (low), S2 (high), S3 (high), the inductance of the adjustable inductor can be controlled to 1 µH, and the inductance of the adjustable inductor by controlling it with S1 (low), S2 (low), and S3 (low) can be controlled with 7 µH. From Equation 1, it is possible to calculate the inductance value of the adjustable inductor 120, and each of the switching units S1, S2, and S3 may be controlled so that the inductance of the adjustable inductor 120 becomes equal to the calculated inductance value or greater than the calculated inductance value.

The switching unit may include two MOSFETs, or may be implemented using one gallium nitride (GaN) FET or other switching device. Or, as shown in FIG. 6, an adjustable inductor may be implemented by comprising a plurality of inductor elements $L_{z1}$, $L_{z2}$, and $L_{z3}$, a bypass path of each inductor element, and switching elements S1, S2, and S3 for selecting the bypass path. The inductance of the adjustable inductor can be controlled by controlling the switching element that connects or bypasses each inductor element.

The converter according to an embodiment of the present invention may include the zero voltage switching circuit described with reference to FIGS. 1 to 6. A detailed description of the configuration of the converter according to an embodiment of the present invention corresponds to a detailed description of the zero voltage switching circuit 100, and thus an overlapping description will be omitted.

A converter according to an embodiment of the present invention comprises: a transformer unit (transformer); a full-bridge circuit being formed as a plurality of switches connected to the primary side of the transformer unit for zero voltage switching; an adjustable inductor which performs zero voltage switching in resonance with a parasitic capacitor of the zero voltage switching unit, and is adjusted according to control of a control unit; and a control unit for controlling the inductance of the adjustable inductor according to at least one among the input voltage of the full-bridge circuit, the input current of the full bridge circuit, the current flowing in the adjustable inductor, and the current flowing in a load being connected to the secondary side of the transformer unit.

As described above, in the present invention, specific matters such as specific components, and the like; and limited embodiments and drawings have been described, but these are only provided to help a more general understanding of the present invention, and the present invention is not limited to the above embodiments, and various modifications and variations are possible from these descriptions by those of ordinary skill in the art to which the present invention belongs.

Therefore, the spirit of the present invention should not be limited to the described embodiments, and not only the claims to be described later, but also all those with equivalent or equivalent modifications to the claims will be said to belong to the scope of the spirit of the present invention.

The invention claimed is:
1. A zero voltage switching circuit comprising:
a zero voltage switching unit configured to form a full-bridge circuit at a primary side of a converter and comprising a plurality of switches for zero voltage switching;
an adjustable inductor configured to perform zero voltage switching in resonance with a parasitic capacitor of the zero voltage switching unit, and be adjusted according to control of a control unit; and
the control unit configured to control inductance of the adjustable inductor according to an input voltage of the zero voltage switching unit or current flowing in the adjustable inductor,
wherein the control unit reduces the inductance of the adjustable inductor when the current flowing through the adjustable inductor increases, and increases the inductance of the adjustable inductor when the current flowing through the adjustable inductor decreases, wherein the adjustable inductor comprises a plurality of inductor elements, wherein each inductor element of the plurality of inductor elements comprises:
- a first inductor having a predetermined inductance;
- a second inductor coupled to the first inductor; and
- a switching unit connected to the second inductor to turn on/off a closed loop comprising the second inductor, and
- wherein the switching unit comprises two MOSFETs which have opposite connection directions, wherein the control unit controls the inductance of the adjustable inductor by measuring an input current of the zero voltage switching unit, the current flowing through the adjustable inductor, or a current flowing through a load at a secondary side of the converter, and wherein the control unit controls the inductance of the plurality of inductor elements differently by individually controlling the plurality of inductor elements.

2. The zero voltage switching circuit according to claim 1, wherein the plurality of inductor elements comprises two or more inductor elements having different inductances.

3. The zero voltage switching circuit according to claim 1, wherein the control unit turns on a part of the switching units of the plurality of inductor elements according to the inductance of the adjustable inductor to be implemented.

4. The zero voltage switching circuit according to claim 1, wherein the control unit measures the input voltage of the zero voltage switching unit or measures the current flowing through the adjustable inductor.

5. The zero voltage switching circuit according to claim 1, wherein the control unit calculates the current flowing through the adjustable inductor by measuring the input current of the zero voltage switching unit.

6. The zero voltage switching circuit according to claim 5, wherein the input current of the zero voltage switching unit is proportional to the current flowing through the adjustable inductor.

7. The zero voltage switching circuit according to claim 1, wherein the control unit calculates the current flowing through the adjustable inductor by measuring the current flowing through the load at the secondary side of the converter.

8. The zero voltage switching circuit according to claim 1, wherein the converter comprises a transformer.

9. A zero voltage switching circuit comprising:
- a zero voltage switching unit configured to form a full-bridge circuit at a primary side of a converter and comprising a plurality of switches for zero voltage switching;
- an adjustable inductor configured to perform zero voltage switching in resonance with a parasitic capacitor of the zero voltage switching unit, and be adjusted according to control of a control unit; and
- the control unit configured to control inductance of the adjustable inductor according to an input voltage of the zero voltage switching unit or current flowing in the adjustable inductor, wherein the control unit increases the inductance of the adjustable inductor when the input voltage of the zero voltage switching unit increases, and decreases the inductance of the adjustable inductor when the input voltage of the zero voltage switching unit decreases, wherein the adjustable inductor comprises a plurality of inductor elements, wherein each inductor element of the plurality of inductor elements comprises:
- a first inductor having a predetermined inductance;
- a second inductor coupled to the first inductor; and
- a switching unit connected to the second inductor to turn on/off a closed loop comprising the second inductor, and
- wherein the switching unit comprises two MOSFETs which have opposite connection directions, wherein the control unit controls the inductance of the adjustable inductor by measuring an input current of the zero voltage switching unit, the current flowing through the adjustable inductor, or a current flowing through a load at a secondary side of the converter, and wherein the control unit controls the inductance of the plurality of inductor elements differently by individually controlling the plurality of inductor elements.

10. The zero voltage switching circuit according to claim 9, wherein the plurality of inductor elements comprises two or more inductor elements having different inductances.

11. A converter comprising:
- a transformer unit;
- a full-bridge circuit connected to a primary side of the transformer unit and comprising a plurality of switches for zero voltage switching;
- an adjustable inductor configured to perform zero voltage switching in resonance with a parasitic capacitor of a zero voltage switching unit and be adjusted according to control of a control unit; and
- the control unit configured to control inductance of the adjustable inductor according to at least one among an input voltage of the full-bridge circuit, an input current of the full bridge circuit, a current flowing in the adjustable inductor, and a current flowing in a load connected to a secondary side of the transformer unit, wherein the control unit reduces the inductance of the adjustable inductor when the current flowing through the adjustable inductor increases, and increases the inductance of the adjustable inductor when the current flowing through the adjustable inductor decreases, wherein the adjustable inductor comprises a plurality of inductor elements, wherein each inductor element of the plurality of inductor elements comprises:
- a first inductor having a predetermined inductance;
- a second inductor coupled to the first inductor; and
- a switching unit connected to the second inductor to turn on/off a closed loop comprising the second inductor, and
- wherein the switching unit comprises two MOSFETs which have opposite connection directions, wherein the control unit controls the inductance of the adjustable inductor by measuring an input current of the zero voltage switching unit, the current flowing through the adjustable inductor, or the current flowing through the load connected to the secondary side of the transformer unit, and wherein the control unit increases the inductance of the adjustable inductor when the input voltage of the zero voltage switching unit increases, and decreases the inductance of the adjustable inductor when the input voltage of the zero voltage switching unit decreases.

* * * * *